(12) United States Patent
Morin

(10) Patent No.: US 7,058,815 B2
(45) Date of Patent: Jun. 6, 2006

(54) METHOD AND SYSTEM FOR DIGITALLY SIGNING MPEG STREAMS

(75) Inventor: Marc Morin, Waterloo (CA)

(73) Assignee: Cisco Technology, Inc., San Jose, CA (US)

( * ) Notice: Subject to any disclaimer, the term of this patent is extended or adjusted under 35 U.S.C. 154(b) by 847 days.

(21) Appl. No.: 09/766,784

(22) Filed: Jan. 22, 2001

(65) Prior Publication Data

US 2002/0138736 A1    Sep. 26, 2002

(51) Int. Cl.
*H04L 9/00*    (2006.01)
(52) U.S. Cl. ................... 713/180; 713/176; 713/178
(58) Field of Classification Search ................ 713/176, 713/178, 180; 380/217, 200, 221, 212, 201, 380/202, 241; 714/758; 348/231.99, 461, 348/152, 231.6, 207.99; 725/135, 136, 31
See application file for complete search history.

(56) References Cited

U.S. PATENT DOCUMENTS

| | | | |
|---|---|---|---|
| 5,892,535 A * | 4/1999 | Allen et al. ................... 725/36 |
| 5,960,081 A | 9/1999 | Vynne et al. | |
| 6,005,643 A | 12/1999 | Morimoto et al. | |
| 6,009,176 A | 12/1999 | Gennaro et al. | |
| 6,047,374 A | 4/2000 | Barton | |
| 6,064,748 A | 5/2000 | Hogan | |
| 6,069,914 A | 5/2000 | Cox | |
| 6,169,843 B1 * | 1/2001 | Lenihan et al. ............... 386/46 |
| 6,459,427 B1 * | 10/2002 | Mao et al. ................... 725/109 |
| 6,493,832 B1 * | 12/2002 | Itakura et al. .............. 713/600 |
| 6,546,013 B1 * | 4/2003 | Huang et al. ............ 370/395.1 |
| 2002/0174366 A1 * | 11/2002 | Peterka et al. .............. 713/201 |

OTHER PUBLICATIONS

ISO/IEP "*Information Technology-Generic Coding Of Moving Pictures And Associated Audio: Systems,*" ISO/IEC 13818-1 Nov. 13, 1994, 135 pages.
ISO/IEP "*Information Technology-Generic Coding Of Moving Pictures And Associated Audio Information: Video*", ISO/IEC 13812-2, 1995, 209 pages.
ISO/IEP "*Information Technology-Generic Coding Of Moving Pictures And Associated Audio: Audio*", ISO/IEP 13808-3, Nov. 11, 1994, 104 pages.

* cited by examiner

*Primary Examiner*—Hosuk Song
*Assistant Examiner*—Pramila Parthasarathy
(74) *Attorney, Agent, or Firm*—Beyer Weaver & Thomas, LLP

(57) ABSTRACT

The present invention discloses a method and system for embedding a digital signature into an MPEG stream. In the preferred embodiment, the digital signature is embedded in a plurality of PCR fields of a transport stream and is encrypted and scrambled to avoid detection and removal. Other embodiments are disclosed, each of which is designed to place a digital signature in a pre-compressed MPEG stream while requiring minimal computing resources to encode and decode the signature.

5 Claims, 4 Drawing Sheets

METHOD AND SYSTEM FOR DIGITALLY SIGNING MPEG STREAMS

FIELD OF THE INVENTION

The present invention relates to the insertion of a digital signature into an MPEG stream to uniquely identify the original source of the stream.

BACKGROUND OF THE INVENTION

Throughout the disclosure and claims, we will be using the term MPEG (Motion Pictures Expert Group). MPEG is a generic reference to a family of international standards, which define how to encode visual and audio information in a digital compressed format.

MPEG is utilized in a wide variety of applications, including: DVD (Digital Video Discs) and satellite transmission of television signals.

The MPEG standards specify exactly the format in which the compressed data is to be transmitted. A key feature of MPEG is that it can compress a video signal into a fraction of its original size. MPEG achieves a high compression for video by storing only the changes from one video frame to another, instead of each entire frame.

There are two major MPEG standards: MPEG-1 and MPEG-2. The most common implementations of the MPEG-1 standard provide video quality slightly below the quality of conventional VCR (Video Cassette Recorder) videos. MPEG-2 provides higher resolution, with full CD quality audio. This is sufficient for the major TV standards, including NTSC (National Standards Television Committee) and HDTV (High Definition Television). MPEG-2 is used by DVD.

As the use of MPEG increases, there has become a need to identify the original provider of an MPEG transmission. The ability to identify the provider is necessary to determine non-authorised use or dissemination of the content in an MPEG transmission. The owner of a digital transmission often wants to know if their transmission has been copied. The attempt to uniquely identify or "fingerprint" a digital transmission has resulted in the following U.S. patents.

U.S. Pat. No. 5,960,081 discloses the concept of "adding an imperceptible or barely visible signature or a watermark to the images". It is clear from the disclosure that the inventors are not certain that the embedding of a signature will not affect the quality of the image (column 13, line 18). As the signature is part of the image it may not always be reliably retrieved, thus the inventors repeatedly code the signature in multiple images, resulting in redundancy and increased bandwidth. The inventors go to great lengths to determine which portion of an image is optimal to contain a signature. This solution is compute intensive, as demonstrated by the use of a massively parallel CRAY computer for the tests cited in the disclosure.

U.S. Pat. No. 6,005,643 discloses a method and system of embedding extra information into the frames of an MPEG video stream. This extra information provides a fingerprint or signature. Multiple algorithms are employed to: determine which frames should contain the new data, avoid loss of image quality and to decode the extra information. This invention requires complex algorithms be implemented in both encoder and decoder. Further, the invention requires modifying image frames to encode the required extra information. In doing so, such a solution must ensure that image quality is not degraded, which is not a simple problem for any algorithm and often easily detected by a viewer.

U.S. Pat. No. 6,009,176 discloses a method of encoding a digital signature in the user data section in the MPEG video elementary stream. Information stored in a first block is encrypted and placed in the next block and the process continues, with each block containing encrypted data based upon the data in the previous block. This solution requires that a decoder be able to read and decrypt each block in real time and determine if it is from the original source. This provides a real time solution to the verification of an MPEG transmission but requires that the decoder decrypt and verify each block before allowing it to be presented to a user.

U.S. Pat. No. 6,047,374 discloses a method of embedding an "authentication stamp" (column 6, line 4) within a digital block. This stamp can comprise any type of data embedded in any type of digital data stream. The algorithm for embedding is left to the reader, but the intent is to embed some form of "meta-data" (column 2, line 66) along with a signature of some form. It is clearly the intent of the inventor that the stamp be embedded directly in an image and the inventor recognizes the flaws in this process. In claim 1 (column 11, line 48,49) he states "so that said bit string is not readily noticeable". As with other prior art, the embedding of signature information within an image does corrupt the image and may make the change visible to a person viewing the image.

U.S. Pat. No. 6,064,748 discloses a method and apparatus for embedding "an additional data bitstream" into the high level headers of an MPEG data stream. Suggested headers are: video sequence header, group of pictures header or picture header. As the headers are not scrambled in an MPEG transmission, this data may be easily extracted. The invention requires that the order of the frames in the data stream be preselected to create a desired bitstream, which would contain the desired signature (column 5, lines 54, 55). This requirement for preselection of frames may result in a less than optimal transmission as confirmed by the inventors (column 4, lines 39–44).

U.S. Pat. No. 6,069,914 discloses a spread spectrum method for inserting and extracting watermarks in video images. The watermarks are created by applying a discrete cosine transform (DCT) to a plurality of 8×8 pixel blocks of an image. A single pseudo random number is inserted into the DCT coefficient of the spectral shaping algorithm for each 8×8 block. The embedding of a watermark does corrupt the image and may make the change visible to a person viewing the image.

There is thus a need for a simple solution to trace the source of an MPEG stream. Such a solution would:

a) imbed a digital signature in the content;
b) not require significant computing resources as usage increases;
c) place the signature in pre-compressed MPEG content;
d) be sufficient for post mortem identification of an MPEG stream; and
e) be sufficiently hidden to protect the removal of the signature.

The present invention addresses this need.

SUMMARY OF THE INVENTION

The present invention is directed to a method for embedding a digital signature in an MPEG stream, the method comprising the step of modifying the PCR field of a transport stream packet, by logically anding off a portion of the lower bits of said PCR field and replacing the portion with all or a part of said digital signature.

The present invention is also directed to a system for embedding a digital signature in an MPEG stream, the system comprising logical means for modifying the PCR field of a transport stream packet, by logically anding off a portion of the lower bits of the PCR field and replacing the portion with all or a part of said digital signature.

The present invention is also directed to a MPEG digital transmission the transmission containing a modified PCR field of a transport stream packet, the modified PCR field containing a portion or all of a digital signature, for the purpose of identifying the digital transmission.

The present invention is further directed to a method for embedding a digital signature in an MPEG stream, the method comprising the step of modifying a transport stream packet to contain a portion or all of the digital signature, the modifying being done to a data structure selected from the set consisting of: adaptation field, private descriptor, PID, null packet, table CRC, or table replacement.

BRIEF DESCRIPTION OF THE DRAWINGS

For a better understanding of the present invention, and to show more clearly how it may be carried into effect, reference will now be made, by way of example, to the accompanying drawings which aid in understanding a preferred embodiment of the present invention and in which.

DETAILED DESCRIPTION OF THE PREFERRED EMBODIMENTS

The present invention is directed toward encoding a signature within an MPEG-2 stream. Before describing the preferred embodiment we first describe the fundamental structure of an MPEG-2 stream.

Figure 1:
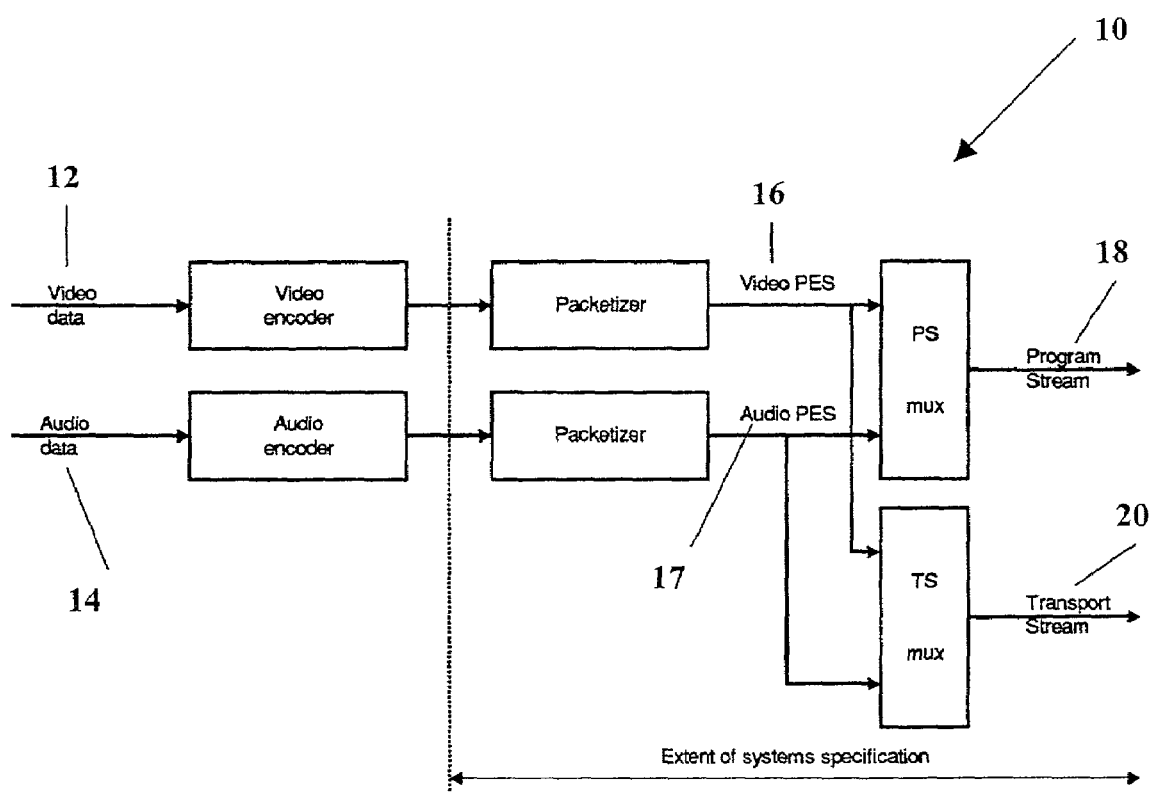
FIG. 1 is a block diagram illustrating an MPEG-2 stream.

Referring now to FIG. 1, a block diagram illustrating an MPEG-2 stream is shown generally as 10. In an MPEG-2 stream 10, a video elementary stream 12 and an audio elementary stream 14 are segmented into video or audio Packetized Elementary Streams (PES) 16 and 17 respectively. PES 16 and 17 are then multiplexed into either a Program Stream 18 or a Transport Stream 20. Program Stream 20 is designed for use in relatively error-free environments and is suitable for applications that may involve software processing of system information such as interactive multi-media applications. Data packets in program stream 18 may be of variable and relatively great length. Transport Stream 20 combines one or more programs (i.e. streams of information) with one or more independent time bases into a single stream. Transport Stream 20 is designed for use in environments where errors are likely, such as transmission in lossy or noisy media. Data packets in Transport Stream 20 are 188 bytes in length.

Before describing the preferred embodiment of the present invention, we will first discuss the options considered by the inventor for embedding a signature in an MPEG-2 stream.

As embedding a signature into the image portion of an MPEG-2 stream requires complex encoding and decoding algorithms, as well as the possibility of image degradation, the inventor instead chose to investigate other options. The areas considered for embedding a signature were:

1) transport stream 20;
2) PES 16, 17
3) video elementary stream 12; and
4) audio elementary stream 14.

Each of these options will be discussed in turn.

1. Transport Stream 20

Transport stream 20 is designed for use in transmission environments where errors are likely, such as storage or transmission in lossy or noisy media. An example would be a video on demand satellite transmission. An environment where Transport Stream 20 would not be needed would be the recalling of data from a DVD on a home PC.

Figure 2:
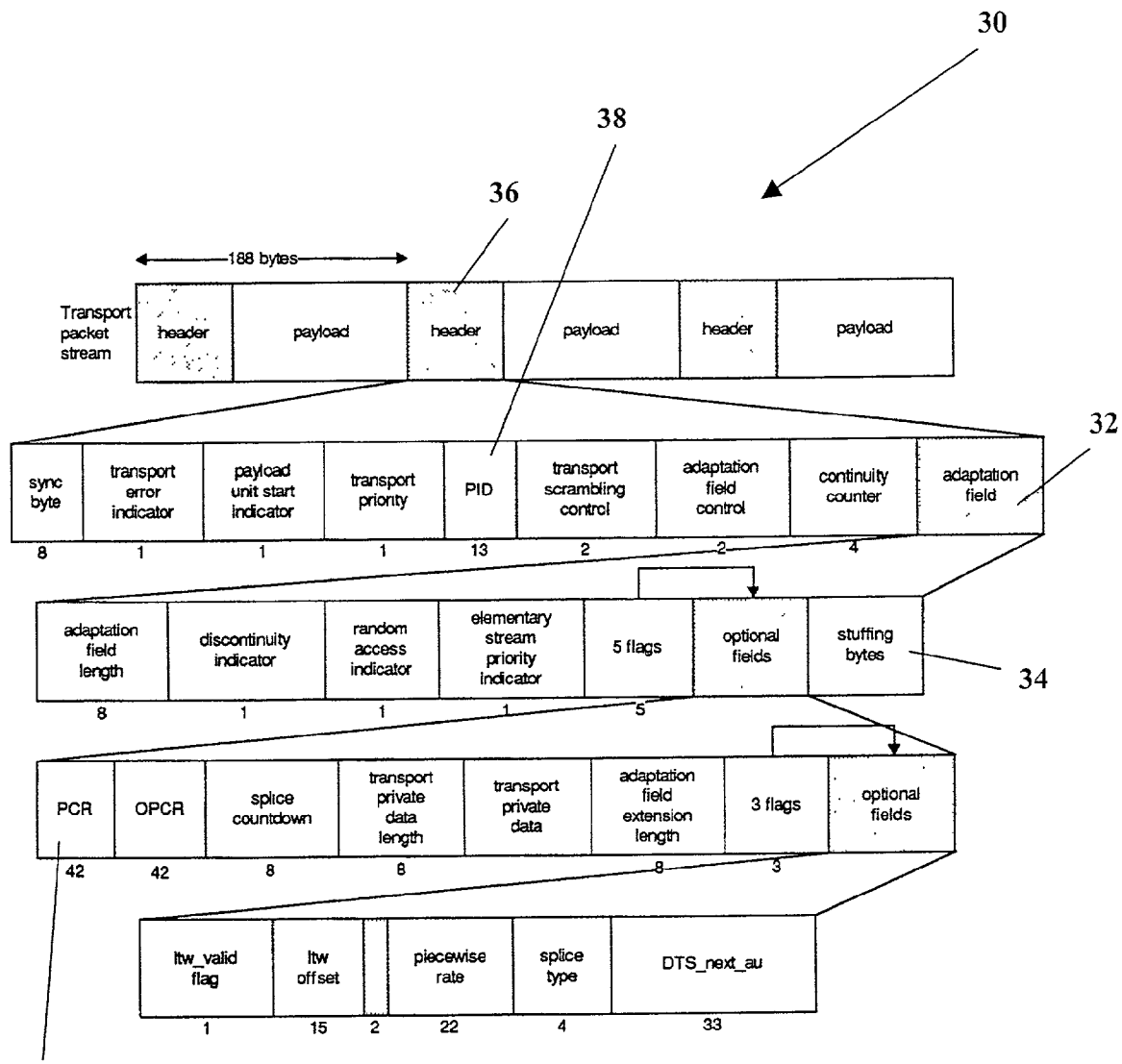
FIG. 2 is a block diagram of a transport stream packet.

Referring now to FIG. 2, a block diagram of a transport stream packet is shown generally as 30. Numerous options were considered in determining where a signature may be inserted in transport stream packet 30, namely:

a) Adaptation Field 32

During encoding, provision may be made to make use of stuffing bytes 34 within adaptation field 32 to store a portion or the entire signature.

b) Private Descriptors

Transport stream packets 30 begin with a four byte header 36 which contains a thirteen bit Packet ID (PID) 38. PID 38 identifies, via Program Specific Information (PSI) tables, the contents of the data contained in a transport stream packet 30. There are four PSI tables:

i) Program Association Table;
ii) Program Map Table;
iii) Conditional Access Table; and
iv) Network Information Table.

These tables contain the necessary and sufficient information to demultiplex and present programs. A program is a stream of data.

Figure 3:
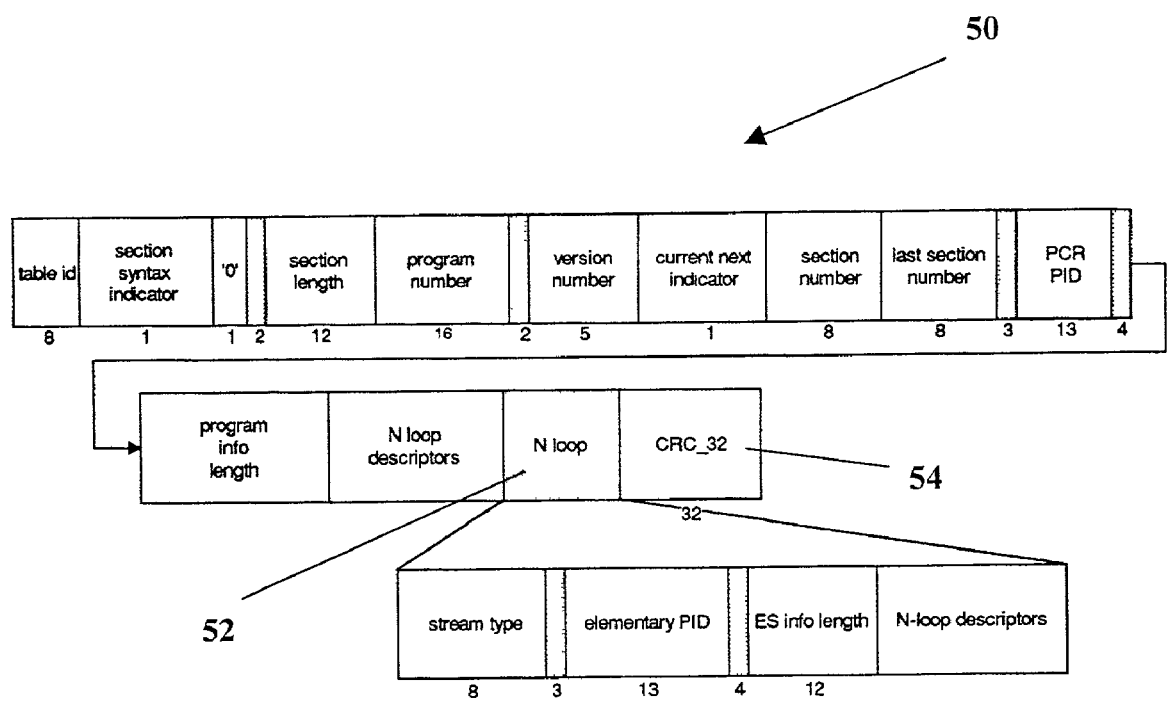
FIG. 3 is a block diagram of a transport stream program map table.

Referring now to FIG. 3, a block diagram of a Program Map Table (PMT) is shown generally as 50. The use of N-loop field 52 permits the insertion of user defined data into PMT 50 but at the cost and complexity of requiring the recomputation of cyclic redundancy check field (CRC) 54.

c) Separate PID 38

Private content may be carried by creating a stream with a separate PID 38. Processing of this stream would require pre-processing and multiplexing of an additional stream, adding to increased bandwidth and the need for the decoder to demultiplex an additional stream.

d) Null Packets

Most MPEG streams have null packets periodically. Null packets are intended for padding of a transport stream. They may be inserted or deleted by re-multiplexing processes and, therefore, the delivery of the payload of null packets to the decoder cannot be assumed. Since a decoder will ignore this packet, the signature could be placed in this packet without any increase in bandwidth or alteration of the packet sequence. Unfortunately, no guarantee of the frequency of null packets can be assumed.

e) Table CRC 54

As discussed in b) above, a transport stream contains Program Association Tables (PAT) and Program Map Tables (PMT). Each of these tables contains a 32 bit cyclic redundancy check field (CRC). An example of this is illustrated in field 54 of FIG. 3. In a transport stream, these tables are repeated approximately ten times per second at the recommendation of the Digital Video Broadcasting group. A 32 bit signature can be embedded in to the CRC field of a PAT or PMT by XORing the signature with the CRC value in the stream. A normal decoder would interpret this as an incorrect CRC and ignore the table, since the information is redundant, this does not cause a problem. A post mortem process would examine and search for CRC errors in the stream and upon findings such a table, compute the real CRC and then XOR it with the value in the stream to reconstruct the signature. This scheme requires no remuxing and sophisticated processing for the stream, but is limited to 32 bit values. Even if the decoder ignores the CRC calculation, the table data area has not been modified thus it would interpret the table correctly. This scheme could be extended to support a signature larger than 32 bits by inserting 32 bits at a time into separate tables. This would result in a longer repetition interval and additional constraints would be required to handle error detection and synchronization.

f) Table Replacement

An extension of the CRC method discussed in e) above would replace an entire table section with a larger information block. A different CRC would then be inserted, such as the negation of the calculated CRC. A normal decoder would likely ignore this table unless it ignored the CRC error. This method allows for the insertion of a larger signature in a single table than the method described in e) above, but is more error prone.

g) Program Clock Reference (PCR) 40

Synchronization when decoding packets is achieved through PCR 40. PCR 40 is a 42 bit time stamp encoding the timing of the stream itself. Decoders are typically designed to have a minimum of one microsecond of PCR jitter, which represents approximately four to five bits of error. By ANDing off the bottom four bits of PCR 40, this now blank area can be used to carry a portion of the signature. The rate of PCR fields 40 is regular in the stream, present in every transport stream and fixed within a transport stream packet 30. Should the signature have a robust error detection mechanism, not all PCR fields 40 need to be replaced.

2. PES 16, 17

Figure 4:
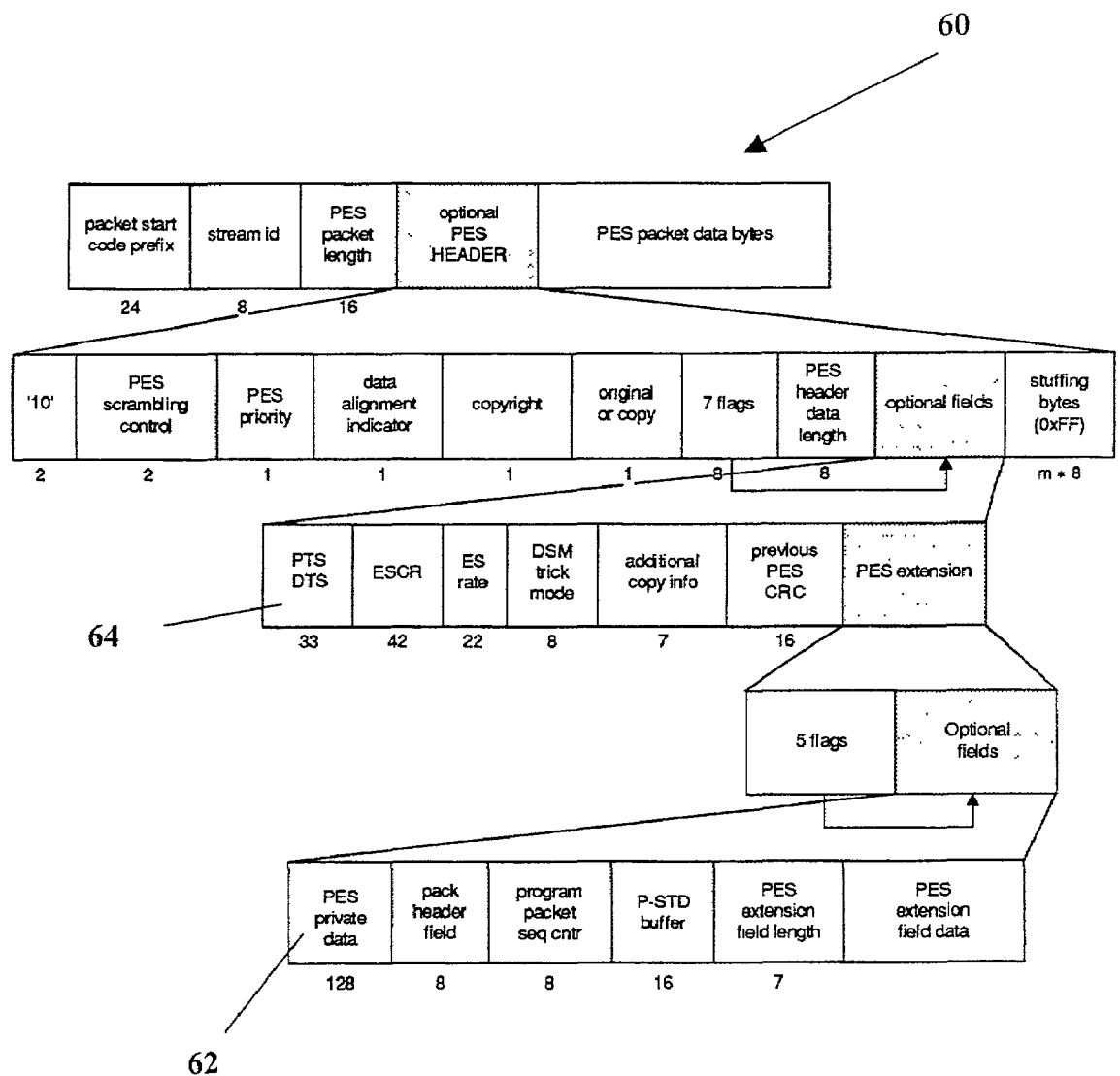
FIG. 4 is a block diagram of a Packetized Elementary Stream.

In an MPEG stream, each elementary bit stream is segmented into a Packetized Elementary Stream (PES), and then respective packets are multiplexed into either of the two streams: Program Stream 18 or Transport Stream 20. Referring now to FIG. 4, a block diagram of a Packetized Elementary Stream is shown generally as 60.

a) Private Data 62

Private data field 62 allows for the insertion of up to 128 bits of user data. This field could hold the signature or a portion thereof. The original elementary stream must have been constructed with the appropriate place holder for the signature.

b) PTS/DTS (Presentation Time Stamp/Decoding Time Stamp) 64

Like the PCR 40 field in transport stream 20, a signature could be inserted in to the PTS/DTS field 64. The sensitivity to jitter is more decoder specific than that of PCR field 40 and would not be as robust as the PCR based solution.

3. Video Elementary Stream 12 a) User Data Field

A user data field is insertable on every frame as well as in the sequence header. Provisions during the original encoding need to have been provided to this space, or inserted via a transrating. Transrating alters the transmission rate of a coded bitstream. The alteration involves either a full syntactic deconstruction of the stream and then re-coding at a lower rate, or an optimized approach that short circuits the full coding process. In either case, the goal is to alter the bitrate of a bitstream, MPEG video in this particular case.

b) Residuals

A signature could be hidden in the frequency components of the video syntax itself. The complexity of processing would be significant.

c) Padding Fields

Video PES stream 16 has two padding bits of "00" at the end of a video sequence. It is possible to use this feature to insert additional data at the end of the video sequence. The data stream cannot contain the "00 00 01" sequence but is likely not limited in length. The decoder is also likely to ignore all of this data as it would be looking for a picture start code. Since the Video PES stream 16 is unlikely to terminate exactly at the end of a transport stream packet, additional information can be added to the Video PES stream 16 by adjusting the last packet. This may easily be achieved by software.

4. Audio Elementary Stream 14 a) Private/User bits

The header of the packets in an audio elementary stream 14 has several bits of information that are not used. Information could be transported in this stream. The header CRC may need to be recomputed with the modification of the header.

Table 1 provides a detailed analysis of each of the above mentioned methods of imbedding a signature in a MPEG-2 stream.

TABLE 1

| | Transport Stream | | | | | | | PES Layer | | Video Elementary | | | Audio |
| --- | --- | --- | --- | --- | --- | --- | --- | --- | --- | --- | --- | --- | --- |
| | Adaptation field | Descriptor | Separate PID | NULL | Table CRC | Table Replacement | PCR | User Data | PTS/DTS | User Data Field | Residuals | Extra Data | Elementary Private/User Bits |
| Requires Transport Stream Pre-Processing to create 'space' in the bitrate. | Y | Y | Y | N | N | N | N | Y | N | Y | Y | N | N |
| Resilient to a remultiplexing operation | N | N | N | N | N | N | N | Y | N | Y | Y | Y | Y |

TABLE 1-continued

| | Transport Stream | | | | | | | PES Layer | | Video Elementary | | | Audio |
| --- | --- | --- | --- | --- | --- | --- | --- | --- | --- | --- | --- | --- | --- |
| | Adaptation field | Descriptor | Separate PID | NULL | Table CRC | Table Replacement | PCR | User Data | PTS/DTS | User Data Field | Residuals | Extra Data | Elementary Private/ User Bits |
| Triggers an error in the stream | N | N | N | N | Y | Y | N | N | N | N | N | N | N |
| Ease of Insertion 1-trivial 2-easy 3-difficult | 3 | 3 | 2 | 1 | 2 | 2 | 1 | 3 | 2 | 3 | 3 | 2 | 2 |
| Ease of detection of information 1-easy and visible 2-not immediately evident 3-not detectable | 1 | 1 | 1 | 2 | 2 | 2 | 3 | 1 | 3 | 2 | 3 | 2 | 3 |
| Data rate supported (bits per second) | 10k | 1k | 100k | 10k | 100 | 1k | 100 | 1k | 100 | 1k | 10k | 1k | 100 |

The inventor has selected for the preferred embodiment, the PCR approach. Embedding signature data in PCR field 40 of Transport Stream 20 has the following advantages:

a) Information Disguise

It is not apparent that the stream has a signature embedded in it, especially if the signature is scrambled to appear random. The number of bits used for a signature could easily be programmable to limit the amount of perceived jitter introduced during the process.

b) Non Error Generating

The insertion of a few bits of data into the lower bits of PCR 40 does not generate an error event in the resulting stream, such as continuity counter errors or table CRC errors. The resulting stream has close to a 100% likelihood of being decoded by any MPEG decoder.

c) MPEG-1 Support

The preferred embodiment is fully compatible with MPEG-1 streams.

d) Implementation Simplicity

The preferred embodiment may be implemented in hardware or software or a combination of both.

e) No pre-processing

The MPEG stream need not be pre-processed to create place holders for the signature data.

Thus, it can be seen that the preferred embodiment provides a simple and efficient solution to the issue of embedding a digital signature into an MPEG stream. In the preferred embodiment an information block containing a signature would have a form as follows:

```
information_block( ) {
    length 16 uimf;    /* number of bytes following length,
                          up to and including CRC32 */
    data( );
    CRC32 32 uimf;    /* CRC-32 as computed in MPEG-2 */
};
encrypted_block( ) {
    DES/PGP/XYZ (information_block( ));
};
transmitted_block( ) {
    reed-solomon[x,y] (encrypted_block( ));
};
```

As shown above, an information_block( ) may be encrypted with an xyz algorithm, perhaps utilizing DES or PGP. This aids in hiding the structure of the information_block( ). Further, in the preferred embodiment, the encrypted_block( ) would be scrambled to further hide the information content as well as to provide an error correction mechanism. A mechanism such as the reed-solomon technique could be used. In transmission, the entire transmitted_block( ) would be sent out in the lower N bits of PCR field 40. The information would be sent in order with least significant data bits first. The bit ordering doesn't explicitly matter, but in order to generate an operational system, both the producer and consumer of the MPEG stream must agree on a convention.

Although the invention has been described with reference to certain specific embodiments, various modifications thereof will be apparent to those skilled in the art without departing from the spirit and scope of the invention as outlined in the claims appended hereto.

As those skilled in the art will appreciate, although this disclosure has been directed to data structures in an MPEG-2 stream, the concepts may be equally applied to any MPEG stream supporting the data structures discussed.

What is claimed is:

1. A method for embedding a digital signature in an MPEG stream, said method comprising modifying a program clock reference (PCR) filed of a transport stream packet, by logically anding off a portion of the lower bits of said PCR field, said PCR field including time stamp information, and replacing said portion with all or a part of said digital signature, wherein said digital signature is encrypted to produce an encrypted signature and wherein said encrypted signature is scrambled to provide for error correction.

2. The method of claim 1 wherein said digital signature may span a plurality of PCR fields in a plurality of packets.

3. A system for embedding a digital signature in an MPEG stream, said system comprising logical means for modifying a program clock reference (PCR) filed of a transport stream packet, by logically anding off a portion of the lower bits of said PCR field, said PCR field including time stamp information, and replacing said portion with all or a part of said digital signature, wherein said digital signature is encrypted to produce an encrypted signature and wherein said encrypted signature is scrambled to provide for error correction.

4. The system of claim 3 wherein said digital signature may span a plurality of PCR fields in a plurality of packets.

5. A system for embedding a digital signature in an MPEG stream, the system comprising:
   means for identifying a program clock reference (PCR) filed of a transport stream packet;
   means for modifying a portion the lower bits of said PCR field;
   means for replacing and said portion with all or a part of the digital signature, wherein said digital signature is encrypted to produce an encrypted signature and wherein said encrypted signature is scrambled to provide for error correction.

* * * * *